United States Patent [19]

Marshall et al.

[11] Patent Number: 5,517,516
[45] Date of Patent: May 14, 1996

[54] OPTICALLY PUMPED CERIUM-DOPED LISRALF$_6$ AND LICAALF$_6$

[75] Inventors: Christopher D. Marshall, Livermore; Stephen A. Payne, Castro Valley; William F. Krupke, Pleasanton, all of Calif.

[73] Assignee: The Regents of the University of California, Oakland, Calif.

[21] Appl. No.: 184,944

[22] Filed: Jan. 21, 1994

[51] Int. Cl.[6] ................................................ H01S 3/16
[52] U.S. Cl. .............................. 372/41; 372/69; 372/70; 372/20
[58] Field of Search .............................. 372/41, 69, 39, 372/40, 20, 21, 70; 385/142; 359/128

[56] References Cited

U.S. PATENT DOCUMENTS

| | | | |
|---|---|---|---|
| 4,083,018 | 4/1978 | Yang et al. | 372/41 |
| 4,132,962 | 1/1979 | Yang et al. | 372/41 |
| 4,167,712 | 9/1979 | Esterowitz et al. | 372/41 X |
| 4,227,159 | 10/1980 | Barrett et al. | 372/20 X |
| 4,233,570 | 11/1980 | Emmett et al. | 372/41 |
| 4,811,349 | 3/1989 | Payne et al. | 372/41 |
| 5,105,434 | 4/1992 | Krupke et al. | 372/69 |
| 5,260,963 | 11/1993 | Baird et al. | 372/41 X |
| 5,287,373 | 2/1994 | Rapoport et al. | 372/41 |

OTHER PUBLICATIONS

P. F. Moulton; Spectroscopic and laser characteristics of Ti:Al$_2$O$_3$; J. Opt. Soc. Am. B, vol. 3, No. 1; pp. 125–133 Jan. 1986.
M. A. Dubinskii et al.; Ce$^{3+}$-doped colquirite-A new concept of all-solid-state tunable ultraviolet laser; J. of Modern Optics, vol. 40, No. 1; pp. 1–5 (1993) no month available.
M. A. Dubinskii et al., Spectroscopy of a New Active Medium of a Solid-State UV Laser with Broadband Single--Pass Gain; Laser Physics, vol. 3, No. 1; pp. 216–217 (1993) no month available.

D. J. Ehrlich et la.; Ultraviolet solid–state Ce:YLF laser at 325 nm; Optics Letters, vol. 4, No. 6; pp. 184–186 Jun. 1979.
R. R. Jacobs et al.; Measurement of excited–state–absorption loss for Ce$^{3+}$ in Y$_3$Al$_5$O$_{12}$ and implications for tunable 5d→4f rare–earth lasers[a] Appl. Phys. Lett. 33(5); pp. 410–412 Sep. 1, 1978.
W. J. Miniscalco et al.; Measurements of excited–state absorption in Ce$^{3+}$:YAG[a] J. Appl. Phys. 49 (12); pp. 6109–6111 Dec. 1978.
D. J. Ehrlich et al.; Optically pumped Ce:LaF$_3$ laser at 286 nm Optics Letters, vol. 5, No. 8; pp. 339–341 Aug. 1980.
N. H. Rizvi et al.; Generation of 33–fs pulses from a passively mode–locked Cr$^{3+}$:LiSrAlF$_6$ laser Optics Letters, vol. 17, No. 22; pp. 1605–1607 Nov. 1992.
B. Gellert et al.; Generation of Excimer Emission in Dielectric Barrier Discharges Appl. Phys. B52; pp. 14–21 (1991) no month available.

*Primary Examiner*—Rodney B. Bovernick
*Assistant Examiner*—Hemang Sanghavi
*Attorney, Agent, or Firm*—Henry P. Sartorio

[57] ABSTRACT

Ce$^{3+}$-doped LiSrAlF$_6$ crystals are pumped by ultraviolet light which is polarized along the c axis of the crystals to effectively energize the laser system. In one embodiment, the polarized fourth harmonic light output from a conventional Nd:YAG laser operating at 266 nm is arranged to pump Ce:LiSrAlF$_6$ with the pump light polarized along the c axis of the crystal. The Ce:LiSrAlF$_6$ crystal may be placed in a laser cavity for generating tunable coherent ultraviolet radiation in the range of 280–320 nm. Additionally, Ce-doped crystals possessing the LiSrAlF$_6$ type of chemical formula, e.g. Ce-doped LiCaAlF$_6$ and LiSrGaF$_6$, can be used. Alternative pump sources include an ultraviolet-capable krypton or argon laser, or ultraviolet emitting flashlamps. The polarization of the pump light will impact operation. The laser system will operate efficiently when light in the 280–320 nm gain region is injected or recirculated in the system such that the beam is also polarized along the c axis of the crystal. The Ce:LiSrAlF$_6$ laser system can be configured to generate ultrashort pulses, and it may be used to pump other devices, such as an optical parametric oscillator.

15 Claims, 5 Drawing Sheets

OPTICALLY PUMPED CERIUM-DOPED LISRALF$_6$ AND LICAALF$_6$

The United States Government has rights in this invention pursuant to Contract No. W-7405-ENG-48 between the United States Department of Energy and the University of California for the operation of Lawrence Livermore National Laboratory.

BACKGROUND OF THE INVENTION

Field Of the Invention

The present invention relates to the pumping of laser systems based on crystals with the chemical formula, Ce-doped XYZF$_6$, where X, Y and Z are respectively singly, doubly, and triply-charged cations. The invention relates particularly to the use of pump light near 266 nm that is polarized along the c axis of a Ce-doped LiSrAlF$_6$ crystal.

While numerous useful solid state lasers have been developed that provide infrared output, the identification of effective visible and ultraviolet-capable solid state laser gain media has proved to be far more problematic. For example, the well-known Nd:YAG laser operates at 1064 nm in the near infrared. The wavelength of operation is directly determined by the nature of the energy levels of the laser ion in the crystal—in this case it is the Nd$^{3+}$ ion in the Y$_3$Al$_5$O$_{12}$ host (known as YAG). Other common rare-earth laser ions include Er$^{3+}$, Tm$^{3+}$ and Ho$^{3+}$; the important laser wavelengths characterizing these ions are once again the infrared, in the 2000–3000 nm region. Lasers based on transition metal ions rather than rare earth ions also tend to operate in the infrared region. For example, Ti$^{3+}$-doped sapphire (Al$_2$O$_3$) has proved to be a very useful laser material that is capable of generating tunable near infrared radiation in the range of 750–1100 nm [P. F. Moulton, "Spectroscopic and laser characteristics of Ti:Al$_2$O$_3$," Journal of the Optical Society of America B 3, 125–133 (1986)]. There have been numerous examples of solid state laser materials that generate laser light in the visible and ultraviolet regions, but none of these lasers has thus far been judged to be adequately robust, efficient and useful so as to become commonly employed within industry or the scientific community.

The unavailability of ultraviolet-generating gain media suddenly changed when Ce-doped LiCaAlF$_6$ was reported to lase reliably [M. A. Dubinskii,et al. "Ce$^{3+}$-doped colquiriite. A new concept of all-solid-state tunable ultraviolet laser," J. Modern Optics 40, (1) 1–5 (1993); M. A. Dubinskii, et al., "Spectroscopy of a New Active Medium of a Solid State UV Laser with Broadband Single-Pass Gain," Laser Physics 3, (1) 216–217 (1993)]. Here, Ce:LiCaAlF$_6$ was pumped with the fourth harmonic 266 nm output of a Nd:YAG laser and demonstrated to yield gain and to provide laser oscillation when appropriately arranged in a cavity. However, the effect of polarization of the pump source was not considered, and no preferred polarization was indicated.

The significance of the work by Dubinskii, et al., can be understood by reviewing the historical context of solid state lasers based on the Ce$^{3+}$ ion. Initial attempts to identify a viable Ce$^{3+}$ laser involved the Y$_3$Al$_5$O$_{12}$ host [Jacobs, et al., "Measurement of excited-state-absorption loss for Ce$^{3+}$ in Y$_3$Al$_5$O$_{12}$ and implications for tunable 5d–4f rare-earth lasers," Applied Physics Letters 33, (5) 410–412 (1978); Miniscalco, et al., "Measurement of excited-state absorption in Ce$^{3+}$:YAG," J. Physics 49, (12) 6109–6111 (1978)]. These original efforts ended in failure in that there was no gain found in Ce:YAG as a consequence of excited state absorption at the emission wavelengths. In other words, for the case of Ce:YAG the pump laser induces loss at the emission wavelengths rather than gain.

Ce$^{3+}$ was later found to exhibit gain in several fluoride hosts, including LiYF$_4$, LaF$_3$ and related crystals (Ehrlich, et al., "Ultraviolet solid-state Ce:YLF laser at 325 nm," Optics Letters 4, (6) 184–186 (1979); Ehrlich, et al., "Optically-pumped Ce:LaF$_3$ laser at 286 nm," Optics Letters 5, (8) 339–341 (1980)]. While these materials did exhibit laser oscillation, they also proved to be very inefficient and to solarize (i.e., color) easily. The result was that the laser output was weak and could not be operated with an adequate repetition rate. Thus it is desirable to find better Ce$^{3+}$ doped laser materials.

Several patents are relevant to the art. The host employed by Dubinskii, et al., LiCaAlF$_6$, was disclosed in U.S. Pat. No. 4,811,349, although with Cr$^{3+}$ dopants. U.S. Pat. No. 4,233,570 discusses the potential use of flashlamps to pump Ce$^{3+}$-laser materials having certain characteristics. U.S. Pat. No. 4,132,962 discloses lasers with Ce-doped fluorides that contain a metal ion from column IIIB of the periodic table. Lastly, U.S. Pat. No. 4,083,018 describes Ce:LiYF$_4$, Ce:LaF$_3$, and other related crystals.

It is generally desired to optically pump a laser as efficiently as possible, in anticipation of maximizing the output. This is usually achieved by selecting a wavelength, and in some cases polarization, for which the pump light absorption is maximized. In cases where the absorption is substantially equal for different polarizations, equivalent performance is expected for all polarizations. Therefore, no particular polarization of the pump source is preferred.

SUMMARY OF THE INVENTION

Accordingly, it is an object of the invention to provide Ce-doped crystals that lase in the ultraviolet and have a LiSrAlF$_6$-type structure.

It is another object of the invention to pump said laser crystals by π-polarized light.

It is also an object of the invention to utilize π-polarized light to extract energy from the laser crystal.

It is a further object of the invention to provide pump sources with which to energize said laser crystals, including ultraviolet flashlamps and continuous-wave ultraviolet-capable ion lasers.

It is an additional object of the invention to mode-lock tunable ultraviolet lasers to generate ultrashort pulses, and to employ these lasers as a driver for an optical parametric oscillator.

The present invention entails the generation of laser light from Ce:LiSrAlF$_6$, by pumping with the 266 nm output from a conventional quadrupled Nd:YAG laser. The LiSrAlF$_6$ host is related to the LiCaAlF$_6$ crystal employed by Dubinskii, et al., in that the Ca ion becomes substituted by a Sr ion. The performance of the Ce:LiSrAlF$_6$ laser was found to be sensitive to the orientation of the pump light polarization in the crystal. No other examples are known where the pump beam polarization so sensitively impacts the performance specifications of the laser system—especially for the situation where the ground state absorption level is comparable for all polarizations.

This invention is more generally directed to pumping Ce-doped crystals having the XYZF$_6$ chemical formula. After observing the crucial impact of the pump polarization on the Ce:LiSrAlF$_6$ laser, the Ce:LiCaAlF$_6$ laser material first identified by Dubinskii, et al., was re-examined. It was found that the pump polarization also impacts the magnitude of the efficiency and gain of Ce:LiCaAlF$_6$, although not nearly as strongly as for Ce:LiSrAlF$_6$; this feature of the laser had not been previously recognized. The invention also is directed to pumping Ce:LiSrAlF$_6$ and related crystals by flashlamps and continuous-wave sources such as ultraviolet capable krypton and argon lasers. The polarization of an extraction beam employed in an amplifying configuration is also optimally oriented when positioned along the c axis of the laser crystal.

The invention comprises the Ce-doped LiSrAlF$_6$ crystal, pumped with 250–280 nm light that is polarized along the c axis of the crystal ($\pi$-polarized) in order to operate efficiently and with high gain. The Ce-doped LiSrAlF$_6$ crystal may be substituted by any of a large variety of related crystals having the general chemical formula, XYZF$_6$, where X is selected from Li, Na, K, and Rb; Y is selected from Mg, Ca, Sr, Ba and Cd; Z is selected from Al, Ga, and Sc. All of these potential gain media may be expected to provide superior laser operation when both the pump and laser light are $\pi$-polarized. Possible pump sources include the common 266 nm output from a frequency-quadrupled Nd:YAG laser, as well as various more esoteric sources such as ultraviolet-capable ion lasers and excimer-based flashlamps. These robust and efficient ultraviolet Ce-lasers can also be mode-locked to yield ultrashort pulses, and can be used to drive nonlinear wavelength shifters such as optical parametric oscillators.

DETAILED DESCRIPTION OF THE INVENTION

Figure 1A:
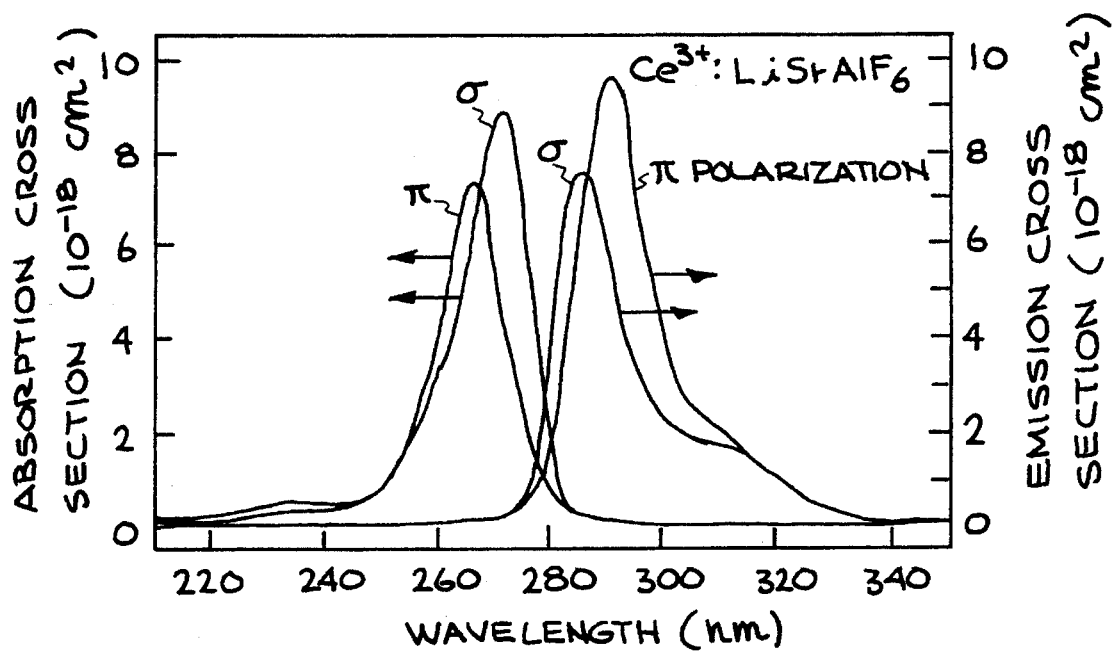
FIG. 1 shows the absorption and emission spectra of Ce$^{3+}$ in LiSrAlF$_6$ and in LiCaAlF$_6$ at room temperature. The polarization of the light field is denoted as $\pi$ (for the electric field of the light being polarized parallel to the c axis of the crystal, or with E $\|$c), and as $\sigma$ for E$\perp$c.
Figure 1B:
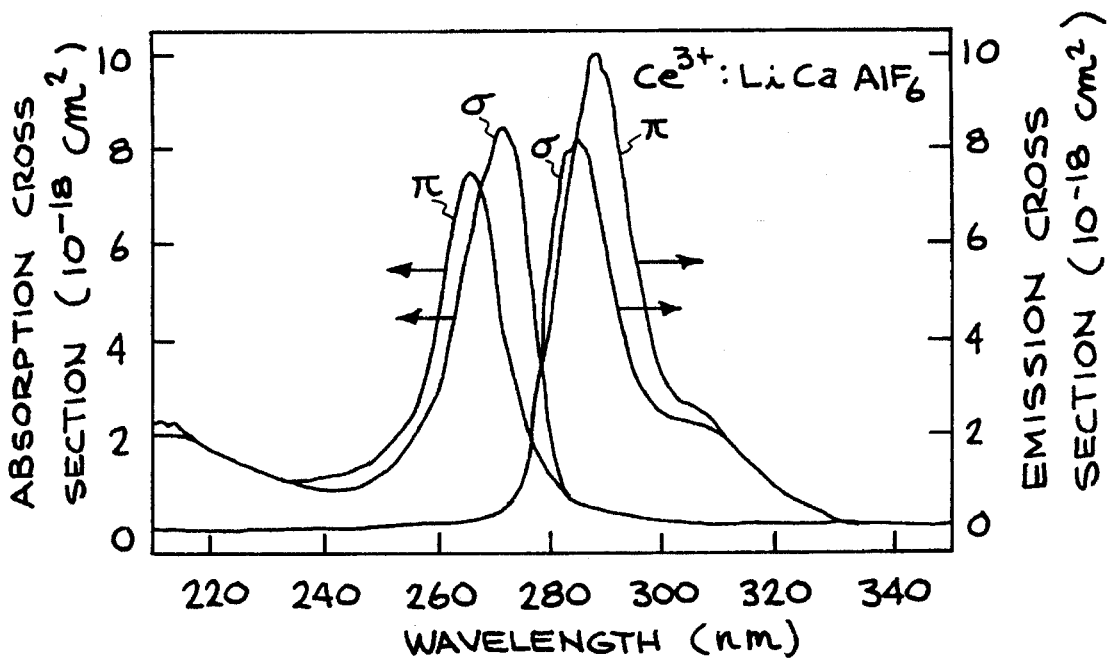

The potential laser performance of a crystal such as Ce$^{3+}$-doped LiSrAlF$_6$ or LiCaAlF$_6$ can be partly evaluated by considering the absorption and emission spectra, as pictured in FIG. 1. The polarization of the light field is noted because these crystals have a uniaxial lattice structure, i.e. the so-called c axis of the crystal is unique with respect to the directions perpendicular to this axis. The polarizations of the light field are dependent on the direction of the electric field, which can be parallel or perpendicular to the c axis (E $\|$c or E$\perp$c, respectively, also know as $\pi$ and $\sigma$ polarized). The spectra in FIG. 1, which are all set on absolute cross section scales, suggest that both the absorption (left-hand-side) and emission (right-hand-side) are fairly similar for the $\pi$ and $\sigma$ polarizations. Thus, it appears that comparable laser results would be achieved if these crystals were pumped in the 255–280 nm range with either polarization, and also that they should exhibit significant gain in the 280–320 nm region for both $\pi$ and $\sigma$ polarizations, as well. However, according to the invention, the preferred means of both pumping energy in, and extracting it out, of Ce-doped LiSrAlF$_6$ and LiCaAlF$_6$ is more subtle than the simple absorption and emission spectra suggest. The light must be predominantly $\pi$-polarized. For the case of the Ce:LiSrAlF$_6$ laser crystal, the system is rendered almost useless unless the pump light is $\pi$-polarized.

Figure 2A:
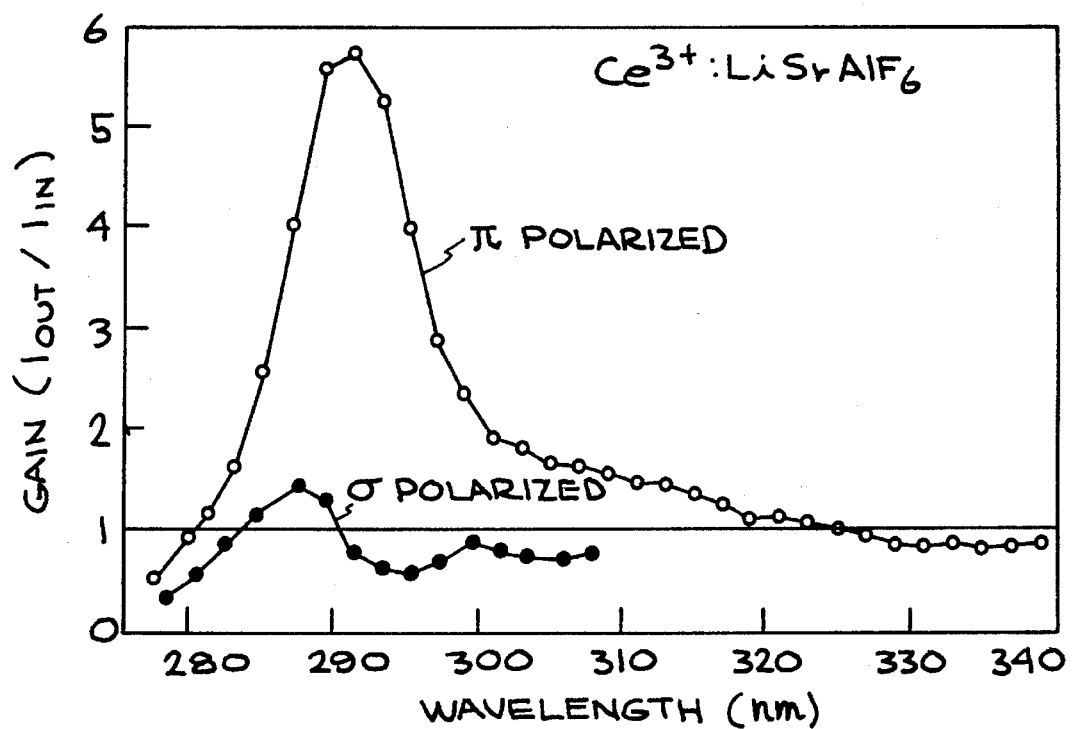
FIG. 2 displays the gain spectra of Ce$^{3+}$ in LiSrAlF$_6$ and LiCaAlF$_6$ as a function of wavelength in the spectral region where the emission occurs. The polarizations of the light are noted.
Figure 2B:
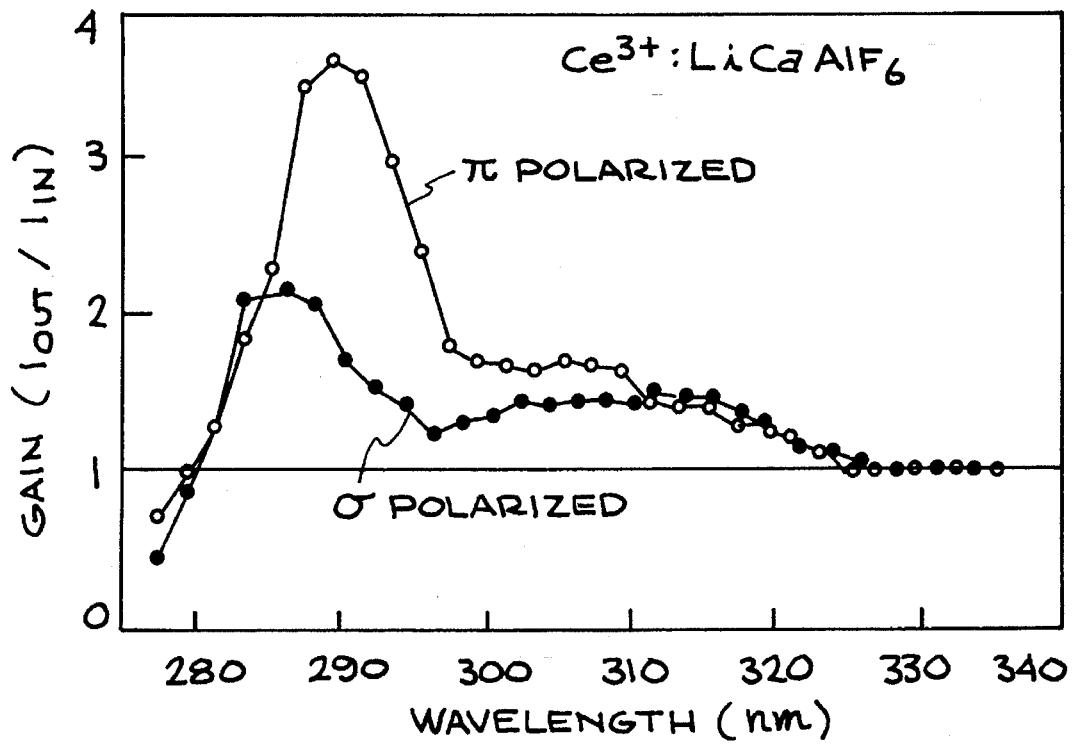

FIG. 2 contains plots of the pump-probe spectra in the emission region of Ce-doped LiSrAlF$_6$ and LiCaAlF$_6$. In these experiments, the crystal is first energized with a $\pi$-polarized 10 nanosecond pulse of light at 266 nm. After the energy becomes stored in the excited states of Ce$^{3+}$, a second weak laser beam (probe) is employed to interrogate the pumped region of the crystal. The probe is scanned in wavelength from 277 to 335 nm, and the intensity of the probe light exiting the crystal is compared to the light level impinging on the crystal surface; the ordinate is simply the ratio of these quantities, which is known as the gain. Gain values greater than one indicate that amplification of light has occurred, while values less than one represent pump-induced loss. The gain is strongly $\pi$-polarized for Ce:LiSrAlF$_6$, in that the $\sigma$-polarized gain measurements are much lower. This result strongly suggests that the extraction beam in a laser system, such as an amplifier, should be $\pi$-polarized. A similar situation exists for the case of Ce:LiCaAlF$_6$ although the effect is not as pronounced. The importance of the light polarization had not been recognized prior to the present invention.

Figure 3A:
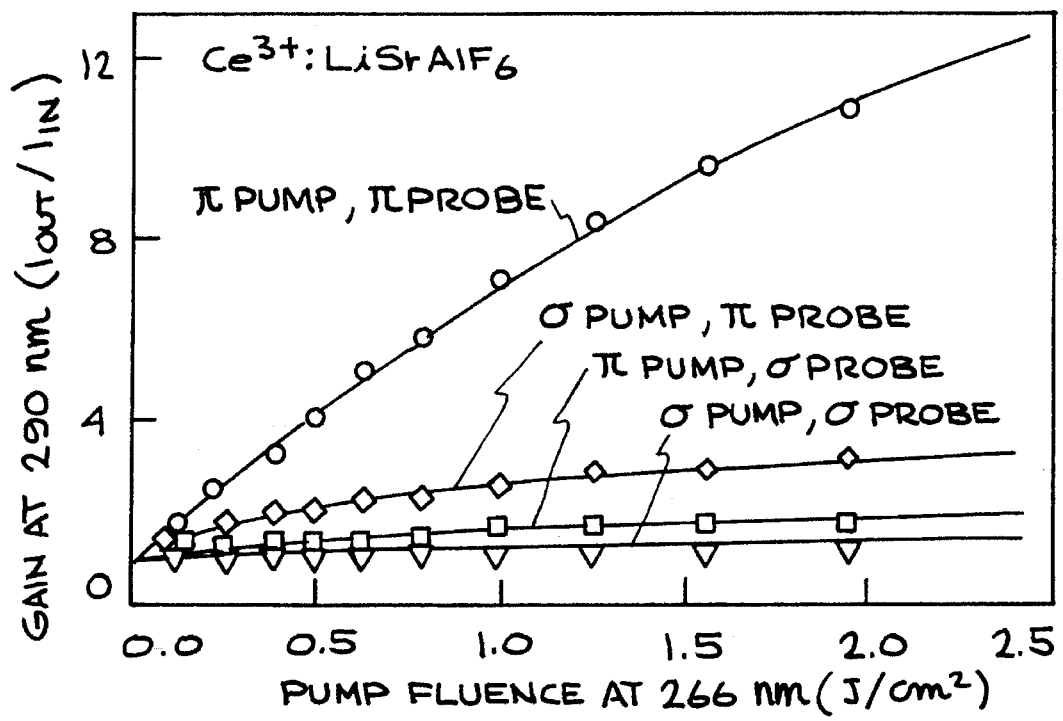
FIG. 3 contains plots of the gain achieved at 290 nm against the 266 nm pump fluence used to energize the Ce$^{3+}$-doped LiSrAlF$_6$ and LiCaAlF$_6$ crystals. The polarizations of the pump laser, as well as that of the probe, or extracting, beam, are noted.
Figure 3B:
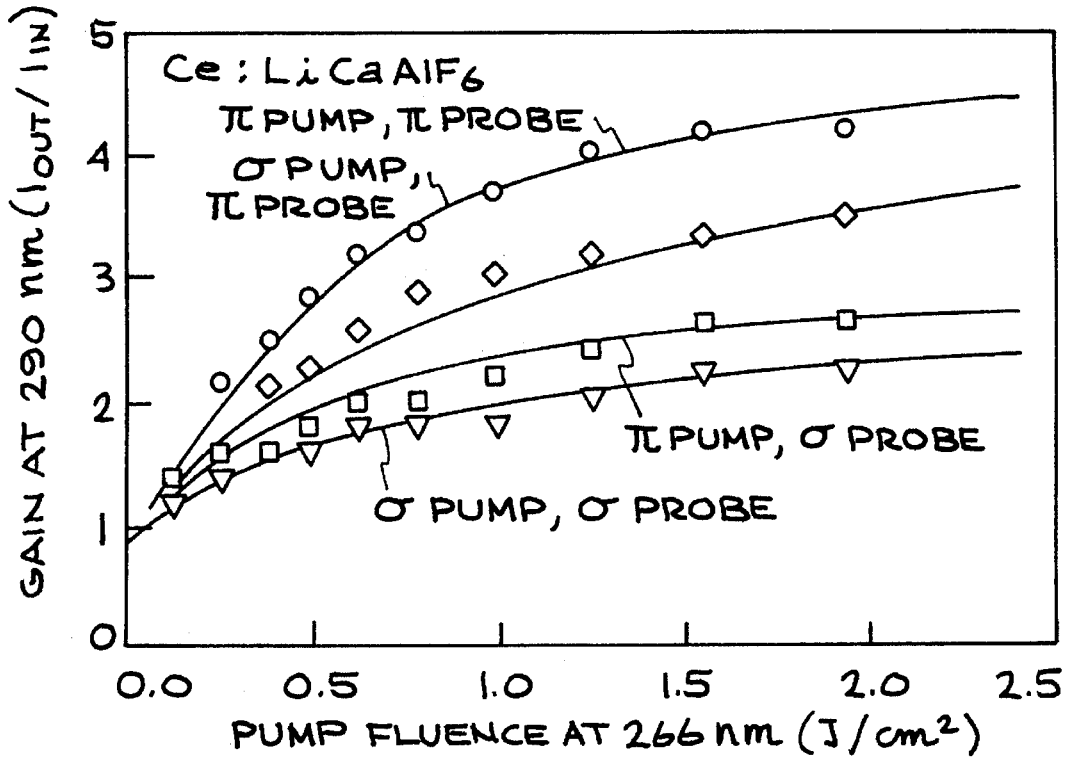

FIG. 3 contains additional pump-probe data, where the gain at 290 nm is plotted as a function of the 266 nm pump beam fluence in Joules/cm$^2$. The upper and lower frames contain data for Ce-doped LiSrAlF$_6$ and LiCaAlF$_6$, respectively, where all four potential combinations of the pump and probe polarizations have been examined. Considering the Ce:LiSrAlF$_6$ data first, the curve involving the $\pi$-polarized pump and the $\pi$-polarized probe yield by far the highest gain. If either the pump or the probe polarization is rotated to $\sigma$, then there is a precipitous drop in the gain. The least effective combination naturally entails both beams being $\sigma$-polarized. The same basic progression exists for Ce:LiCaAlF$_6$, although the magnitude of the changes is not as substantial. Based on common knowledge and practice in the art, one would not be able to recognize the need to pump the crystal with $\pi$-polarized light, as the actual circumstances clearly warrant. The basis for the strong polarization effect involves the existence of strongly polarized absorption from the excited state of Ce$^{3+}$, which negatively impacts both the pumping and extraction processes. This negative impact can be minimized by employing $\pi$-polarized light for both the pumping and extracting beams, and this method is particularly critical for the Ce:LiSrAlF$_6$ crystal (which was first demonstrated to lase as part of this invention).

Figure 4A:
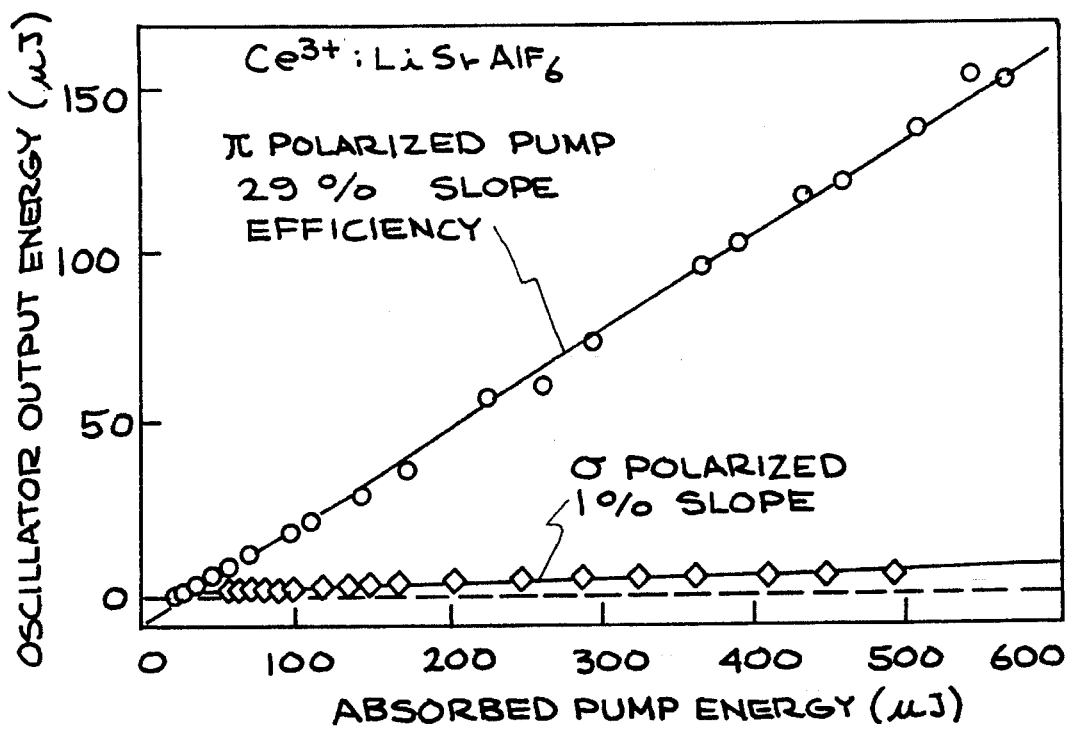
FIG. 4 shows the output energy of Ce$^{3+}$-doped LiSrAlF$_6$ and LiCaAlF$_6$ laser oscillators as a function of the energy delivered by the pump beam. The polarization of the pump beam is noted.
Figure 4B:
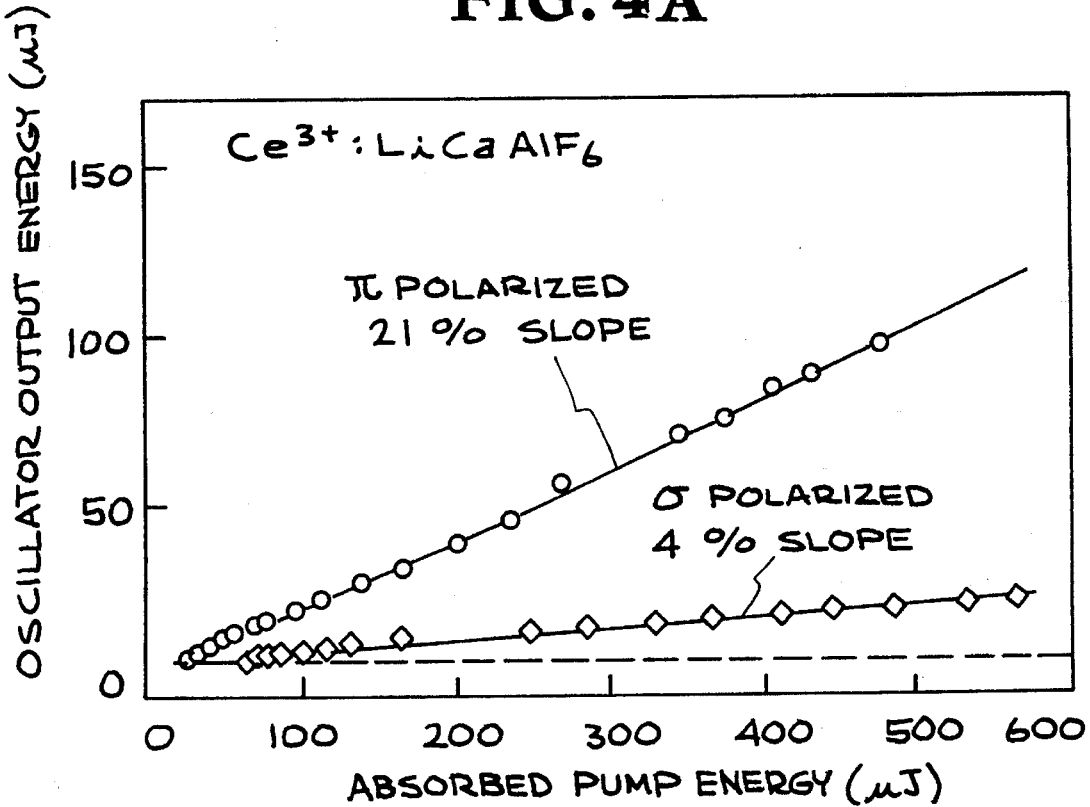

FIG. 4 contains plots of the energy output of the Ce:LiSrAlF$_6$ and Ce:LiCaAlF$_6$ lasers as a function of the pump energy input into the laser crystal. In these experiments two mirrors are aligned to be parallel (forming the cavity) with the Ce:LiSrAlF$_6$ or Ce:LiCaAlF$_6$ crystal being located in the center of the cavity. Following the introduction of a pulse of 266 nm light into the crystal, a burst of light at 290 nm is generated by the Ce-laser cavity. There is clear confirmation of the requirement to pump the crystal with $\pi$-polarized light which yields a slope efficiency of 29% for Ce:LiSrAlF$_6$, compared to only 1% for the σ-polarized pump light. The same type of polarization effect is apparent for Ce:LiCaAlF$_6$ although, once again, it is not quite as dramatic.

Figure 5:
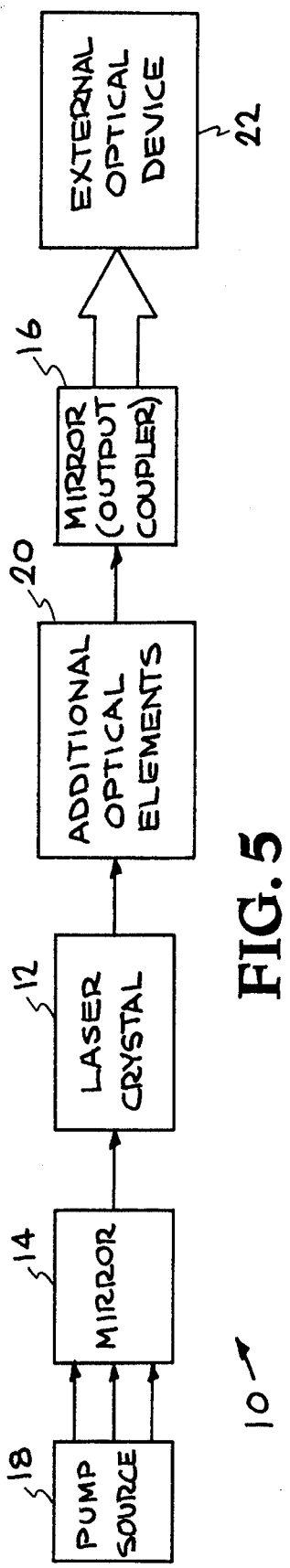
FIG. 5 is a schematic diagram of a solid state laser based on Ce$^{3+}$-doped LiSrAlF$_6$ or LiCaAlF$_6$.
Figure 6:
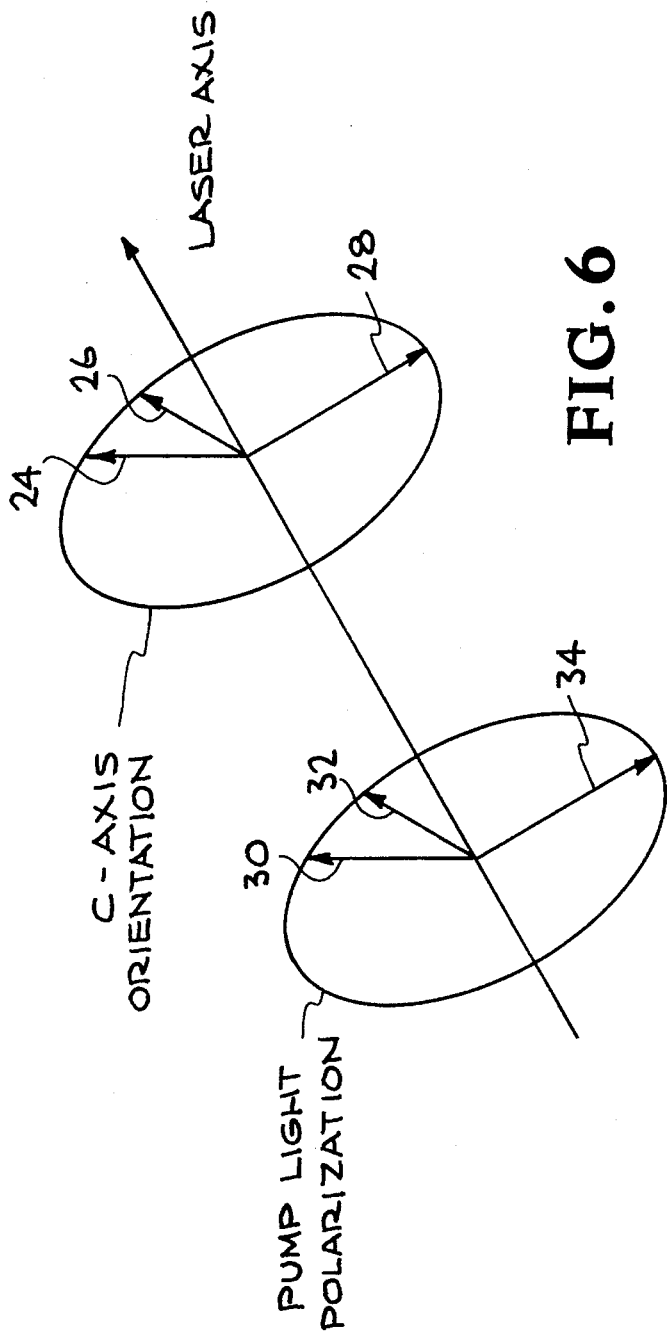
FIG. 6 illustrates the alignment of pump light polarization with the c-axis of the crystal.

The Ce:LiSrAlF$_6$ laser can, in principle, be operated in a substantial number of different configurations, which are generically represented by the schematic diagram in FIG. 5. The main components of the laser 10 include the laser crystal 12, the two mirrors 14 and 16 (comprising the cavity and which can be eliminated for amplifier configurations), and the pump source 18, used to energize the laser crystal 12. As shown, the crystal 12 is end pumped by source 18 through mirror 14, i.e. along the laser axis, but other pump geometries, e.g. side pumped, can also be used. The polarization of the pump light is aligned with the c-axis of the crystal. As illustrated in FIG. 6, the c-axis is in a plane perpendicular to the laser axis. If the c-axis is oriented in position 24, then the pump polarization is in position 30 aligned therewith. If the c-axis is in position 26, then the pump polarization would be in position 32. Similarly for positions 28, 34.

Examples of pump sources include the 266 nm fourth harmonic output of the Nd:YAG laser as noted above, as well as less well-known alternative sources such as excimer flashlamps [e.g., based on chlorine which has a strong emission peak near 258 nm, Gelbert, et al., "Generation of excimer emission in dielectric barrier discharges," Applied Physics B 52, 14–21 (1991). Since this type of flashlamp is very uncommon, those skilled in the art are generally unlikely to recognize their utility with the LiSrAlF$_6$ type crystal to produce a low cost ultraviolet laser system. Furthermore, continuous-wave ion lasers (e.g., the 265 nm line offered by certain krypton lasers) are also highly specialized in nature and are not commonly recognized as being potentially available. The combination of Ce:LiSrAlF$_6$ (or chemically related crystals such as LiCaAlF$_6$, LiSrGaF$_6$, etc.), with an ultraviolet capable ion laser represents a novel and unobvious combination of somewhat esoteric technologies. The potential viability of a continuous-wave Ce:LiSrAlF$_6$ laser leads to additional possibilities that may be realized by including additional optics, 20, in the laser cavity of FIG. 5. One example is a self-mode-locked oscillator, wherein several prisms and an aperture must be properly introduced so as to enable the generation of pulses having picosecond or femtosecond duration. [Rizvi, et al., "Generation of 33-fs pulses from a passively mode-locked Cr$^{3+}$:LiSrAlF$_6$ laser," Optics Letters 17, 1605–1607 (1992)].

The following are some typical operating parameters. The laser may be pumped with a Cw laser or flashlamps in the 250–290 nm range. The system may be operated as a laser, with a resonant cavity, or just as an amplifier. An external beam in the 270–340 nm range can be injected in to LiSAF or LiCAF material for amplification, while a beam of 250–360 nm can be injected and amplified with the more general XYXF$_6$ material. Pulses of 0.01 psec to 100 nsec can be amplified, as well as longer and shorter pulses.

The availability of an efficient, robust, tunable ultraviolet laser permits the use of this system to drive subsequent wavelength converters, such as an optical parametric generator. Here, an external optical device 22 may be employed to shift the 280–320 nm output of the Ce:LiSrAlF$_6$ oscillator to longer wavelengths than would otherwise be available.

Changes and modifications in the specifically described embodiments can be carried out without departing from the scope of the invention which is intended to be limited only by the scope of the appended claims.

We claim:

1. A laser system comprising a laser crystal and a pump source to energize said crystal wherein:

said laser crystal is Ce$^{3+}$-doped XYZF$_6$, where X is selected from Li$^+$, Na$^+$, K$^+$ or Rb$^+$; Y is selected from Mg$^{2+}$, Ca$^{2+}$, Sr$^{2+}$, Ba$^{2+}$, or Cd$^{2+}$; Z is selected from Al$^{3+}$, Ga$^{3+}$, or Sc$^{3+}$;

said pump source is predominantly polarized along the c axis of said crystal to reduce polarization dependent excited state absorption by said crystal.

2. The laser system of claim 1 wherein said pump source is a continuous-wave laser emitting light in the 250–290 nm wavelength range.

3. The laser system of claim 1 further comprising means for injecting an external light beam in the 250–360 nm wavelength range into said laser system for the purpose of being amplified, and wherein said injected laser beam is predominantly polarized along the c axis of said laser crystal.

4. The laser system of claim 1 wherein said pump source is a pulsed flashlamp with spectral emission in the 240–290 nm wavelength range.

5. The laser system of claim 1 further comprising an optical parametric oscillator aligned with and pumped by the light output of said laser system.

6. A laser system comprising a laser crystal and a pump source to energize said crystal wherein:

said laser crystal is Ce$^{3+}$-doped LiSrAlF$_6$;

said pump source is predominantly polarized along the c axis of said crystal to reduce polarization dependent excited state absorption by said crystal.

7. The laser system of claim 6 wherein said pump source is a continuous-wave laser emitting light in the 250–290 nm wavelength range.

8. The laser system of claim 6 further comprising means for injecting an external light beam in the 270–340 nm wavelength range is injected into said laser system for the purpose of being amplified, and wherein said injected laser beam is predominantly polarized along the c axis of said laser crystal.

9. The laser system of claim 6 wherein said pump source is a pulsed flashlamp with spectral emission in the 240–290 nm wavelength range.

10. The laser system of claim 6 further comprising an optical parametric oscillator aligned with and pumped by the light output of said laser system.

11. A laser system comprising a laser crystal and a pump source to energize said crystal wherein:

said laser crystal is Ce$^{3+}$-doped LiCaAlF$_6$;

said pump source is predominantly polarized along the c axis of said crystal to reduce polarization dependent excited state absorption by said crystal.

12. The laser system of claim 11 wherein said pump source is a continuous-wave laser emitting light in the 250–290 nm wavelength range.

13. The laser system of claim 11 further comprising means for injecting an external light beam in the 270–340 nm wavelength range is injected into said laser system for the purpose of being amplified, and wherein said injected laser beam is predominantly polarized along the c axis of said crystal.

14. The laser system of claim 11 wherein said pump source is a pulsed flashlamp with spectral emission in the 240–290 nm wavelength range.

15. The laser system of claim 11 further comprising an optical parametric oscillator aligned with and pumped by the light output of said laser system.

\* \* \* \* \*